Figure 1:
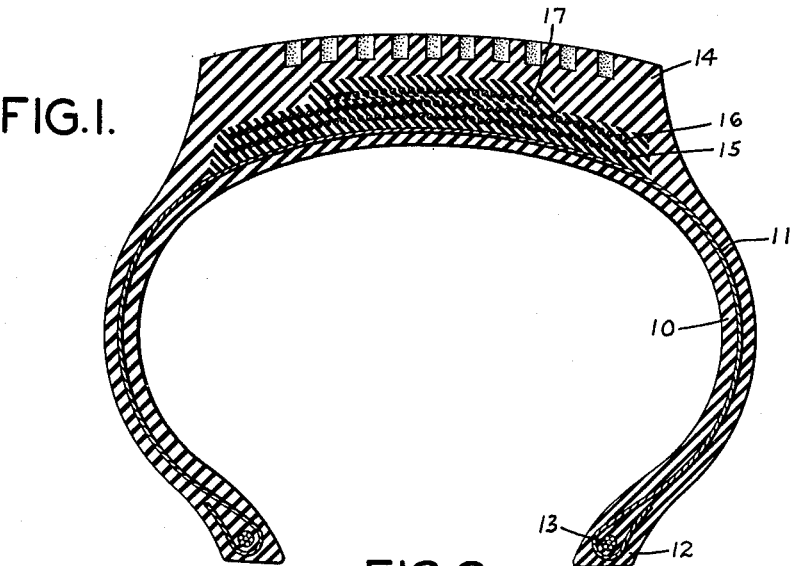

INVENTORS:
GABRIEL XAVIER ROGER BOUSSU
GEORGES LOUIS TRAVERS
BY

THEIR ATTORNEYS form of tire casing embodying the present invention.

United States Patent Office 3,131,744
Patented May 5, 1964

3,131,744
PNEUMATIC TIRES
Gabriel Xavier Roger Boussu, Chamalieres, Puy-de-Dome, and Georges Louis Travers, Clermont-Ferrand, France, assignors to Michelin & Cie, Clermont-Ferrand, France
Filed Sept. 21, 1961, Ser. No. 139,768
Claims priority, application France Sept. 22, 1960
5 Claims. (Cl. 152—361)

This invention relates to improvements in pneumatic tires and it relates particularly to tire casings of the tube-containing and tubeless types having improved roadability, riding comfort, and operating life.

In accordance with the invention, tire casings are provided which have the usual carcass and a tread, side walls and bead edges united with the carcass and in which crown plies embedded in a high modulus rubber are located in the tread zone of the plies in such relation as to provide greatly improved roadability and excellent riding comfort.

More particularly, in accordance with the invention, the new tire casings contain two crown plies, each formed of substantially parallel cables, i.e., metallic wires or cables comprised of a plurality of metallic filaments, these plies being substantially co-extensive with said tread and a third narrower crown ply of substantially parallel cables disposed radially outside the two plies or between them and centrally of the tread, the narrower crown ply having a width not exceeding 75% of the width of the tread, all of the crown plies being embedded in rubber having a high modulus of elasticity, i.e., 350 g./mm.² at 100% elongation or higher and having the cables in each ply crossing the cables of the other crown plies in a generally triangulated relation. The cables of the two wider crown plies are disposed at angles between 8° and 40° to the equator of the casing, while the cables in the narrower crown plies are disposed at an angle between about 90° and 40° to the equator of the casing.

In the carcass, the reinforcing elements, e.g., metallic cables or cords formed of textile fibers such as glass, synthetic resins, natural fibers and the like, are disposed substantially radially, i.e. in planes passing through the axis of rotation of the tire.

The road-holding ability or roadability of tire casings embodying the present invention is substantially better than, and the rolling or riding comfort thereof, is as good as that of any of the tire casings previously known.

Inasmuch as it is generally recognized that improvement in roadability is accompanied by a decrease in riding comfort, the improved characteristics of the new casings are unexpected and difficult to explain mathematically. However, they appear to result from the fact that the cables of the narrower crown ply extend in a substantially radial direction and, together with the reinforcing elements of the carcass, constitute a sort of a flexible girder which prevents the deformation of the tread when rotating or rolling during turning or drifting. Inasmuch as the girder is not rigid in a radial direction, it does not adversely affect the riding comfort of the tire which is affected largely by radially directed forces and the distribution and absorption thereof. In this girderlike structure, the narrower crown ply must consist of metallic elements such as the cables referred to above, in order to resist the axial compression strains or buckling stresses which are normally exerted during rolling of the tire. The combination of the narrower crown plies and the wider crown plies which extend at different angles, thereby prevents deformation of the tread, without diminishing the riding comfort of the tire.

Figure 2:
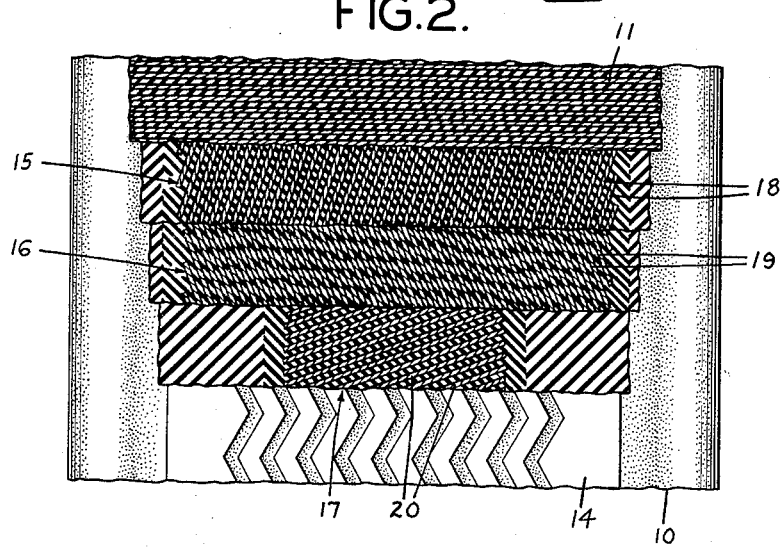
Figure 3:

For better understanding of the present invention, reference may be had to the accompanying drawings in which FIG. 1 is a view in cross-section through a portion of a tire embodying the present invention;

FIG. 2 is a plan view of a portion of the tire with parts broken away to disclose details of constructions; and FIG. 3 is a view in section taken through the tread and a portion of the carcass and sidewalls of a modified form of tire casing embodying the present invention.

The form of tire casing shown in FIGS. 1 and 2 includes a carcass 10, reinforced by substantially radially extending cords, cables, or the like 11, and having beads 12 at its rim-engaging-edges, which are reinforced with the usual bead wires or cables 13. A tread 14 is mounted on and united with the carcass 10, and is reinforced by means of three layers of crown plies 15, 16 and 17 composed of cables embedded in a suitable elastomer, to be described hereinafter. The plies 15 and 16 extend substantially over the entire width of the tread 14. As best shown in FIG. 2, the cables 18 of the ply 15 are substantially parallel and, as illustrated, extend at an angle of about 20° to the equator of the tire casing which is represented by the dot-dash line in FIG. 2.

In the ply 16, the cables 19 cross the cables 18 and also extend at an angle of about 20° to the equator of the casing. The inclinations of the cables 18 and 19 can be varied within a range of about 8° to 40° with respect to the equator of the casing but preferably they are disposed at an angle between about 10° and 30° to the equator of the casing.

In the ply 17, the cables 20 are substantially parallel, and, as illustrated, are disposed at an angle of about 70° to the equator of the tire casing. The inclination of the cables 20 is susceptible to variation and may, in fact, have an inclination between 90° and 40° with respect to the equator of the tire casing.

In the form of the invention shown in FIGS. 1 and 2, the cables of the plies 15 and 16 are embedded in an elastomer having a modulus of elasticity of about 1000 g./mm.² at 100% elongation, the elongation being calculated on the basis of a shorter elongation such as 25% elongation.

An elastomer, such as rubber, having a modulus of elasticity of approximately 500 g./mm.² at 100% elongation sheaths the cables 20 of the ply 17 so that all of the crown plies 15, 16 and 17 are embedded in and are united by coatings of high modulus rubber. In practice, the modulus of elasticity of the rubber of the several plies, 15, 16 and 17, is susceptible to considerable variation but for improved roadability of the tire, it should not be less than 350 g./mm.² at 100% elongation and may be as high as 1200 g./mm.² or even higher.

As shown in FIGS. 1 and 2, the ply 17 is centrally located with respect to the tread and is only about 60% as wide as the tread. Its maximum width should not exceed 75% of the width of the tread in order to avoid a marked decrease of the riding comfort and preferably it should not be substantially less than 30% of the width of the tread to afford improved roadability.

FIG. 3 shows another embodiment of the invention in which the narrower crown ply 21 is interposed between the crown plies 22 and 23 which are substantially co-extensive with the tread portion. As indicated above, each of the plies 21, 22 and 23 is embedded in high modulus rubber of the kind described in connection with FIG. 1, e.g., the ply 21 contains rubber having a modulus of 500 g./mm.² and the plies 22 and 23 contain rubber having a modulus of 1000 g./mm.².

It has been found that the roadability or road holding ability of the tire is adversely affected by placing the narrower crown ply radially inwardly of the wider crown plies and the riding comfort is adversely affected if the crown ply 17 or 21 exceeds about 75% of the width of the tread although its roadability is improved. The road holding ability is measured by the relationship of the lateral effort to the load while the tire rolls with a deflection of 2°. For example, if the measurement is 0.38, a tire is considered to have excellent road holding ability. Higher values indicate even better road holding or roadability.

The following table shows the effect of the change in positions of the narrow and wide plies in the crown area of the tire and the effect of using three crown plies of equal width on the road holding ability and comfort of the tire. Columns (a) and (b) of the table relate to tire casings constructed as shown in FIGS. 1 and 2 and identify to respective plies by the reference characters used in the drawings. Column (c) relates to a tire casing of the type shown in FIG. 3. Column (d) relates to a casing in which the narrower ply identified by reference numeral 17' is disposed radially inside both of the wider plies 15' and 16'. Column (e) relates to a casing having three cable plies co-extensive with the tread.

The modulus of the rubber in each ply is as indicated in the table.

Table

| (a) | (b) | (c) | (d) | (e) |
|---|---|---|---|---|
| Figs. 1 and 2 | | Fig. 3 | | |
| Position and modulus of plies | Position and modulus of plies | Position and modulus of plies | Position and modulus of plies | Three plies of a width equal to the width of the tread |
| Plies:<br>17, app. 500.<br>16, app. 500.<br>15, app. 500. | Plies:<br>17, app. 500.<br>16, app. 1,000.<br>15, app. 1,000. | Plies:<br>22, app. 1,000.<br>21, app. 500.<br>23, app. 1,000. | Plies:<br>16', app. 1,000.<br>15', app. 1,000.<br>17', app. 500. | Modulus of 2 of the 3 plies—1,000.<br>Modulus of the third Ply—350. |
| Road Holding Ability | | | | |
| 0.39 | 0.445 | 0.41 | 0.365 | 0.465 |
| Comfort | | | | |
| Excellent | Very good | Very good | Very good | Very bad |

As shown in the table, when all of the plies in the order shown in FIGS. 1 and 2 are embedded in rubber having a modulus of elasticity of 500, the road holding ability is excellent and the comfort is also excellent. When the modulus of elasticity of the rubber in which the wider plies 16 and 17 are embedded is increased to 1000, the road holding ability is markedly improved while the riding comfort is still very good. With the plies arranged as shown in FIG. 3, the riding comfort of the tire is still very good and the road holding ability exceptionally good. However, when the narrow ply is placed radially inside both of the wider plies, the road holding ability drops well below that of any of the other modifications of the tire shown in the table. Nevertheless, the road comfort remains very good.

With three plies of equal width the roadability is excellent, but the comfort is very bad.

From the foregoing it will be clear that the novel relations and combinations of crown plies and high modulus rubber as disclosed herein enable tire casings to be produced with superior road holding ability and excellent riding comfort.

It will be understood that that the modulus of the rubber in which the crown ply is embedded, the arrangement of the several crown plies, and reinforcing elements used therein and for reinforcing the carcass, are susceptible to variation as disclosed herein. Accordingly, the examples of the invention disclosed herein should be considered as illustrative.

We claim:
1. Tire casing having a carcass and tread thereon, two plies of crown cables in and substantially co-extensive with said tread, the cables in each ply being parallel and embedded in an elastomer having a modulus of elasticity of at least 350 g./mm.$^2$ at 100% elongation, the cable of one of said plies crossing and inclined relative to the cables in the other ply, and a narrower crown ply of cables in said tread positioned radially outwardly of the innermost of said two crown plies, said narrower crown ply not exceeding about 75% of the width of said tread, said cables of said narrower ply being inclined with respect to the equator of said carcass at an angle between about 90° and 40° and disposed substantially centrally of the width of said tread.

2. A tire casing having a carcass and tread thereon, two plies of crown cables in and substantially co-extensive with said tread, the cables in each ply being parallel and embedded in an elastomer having a modulus of elasticity of about 1000 g./mm.$^2$ at 100% elongation, the cables of one of said plies crossing and inclined relative to the cables in the other ply, and a narrower crown ply of cables in said tread positioned radially outwardly of the innermost of said two crown plies, said cables of said narrower ply being inclined with respect to the equator of said carcass at an angle between about 90° and 40° and disposed substantially centrally of the width of said tread.

3. The tire casing set forth in claim 2 in which said cables in said two crown plies are inclined at an angle between about 8° and 40° to the equator of said carcass.

4. The tire casing set forth in claim 2 in which the cables of said narrower ply are embedded in rubber having a modulus of elasticity in excess of 350 g./mm.$^2$ at 100% elongation.

5. A tire casing having a carcass and tread thereon, two plies of crown cables in and substantially co-extensive with said tread, the cables in each ply being parallel and embedded in an elastomer having a modulus of elasticity of at least 350 g./mm.$^2$ at 100% elongation, the cables of one of said plies crossing and inclined relative to the cables in the other ply, and a narrower crown ply of cables in said tread positioned radially outwardly of the innermost of said two crown plies, said narrower crown ply not exceeding 75% of the width of said tread, said cables of said narrower ply being inclined with respect to the equator of said carcass at an angle between about 90° and 40° and disposed substantially centrally of the width of said tread and being embedded in the rubber having a modulus of elasticity in excess of 350 g./mm.$^2$ at 100% elongation.

References Cited in the file of this patent

UNITED STATES PATENTS

| 1,842,353 | Lorentz | Jan. 19, 1932 |
| 2,721,185 | Schultz et al. | Oct. 18, 1955 |
| 2,826,233 | Cooper | Mar. 11, 1958 |
| 2,874,742 | Lugli | Feb. 24, 1959 |

FOREIGN PATENTS

| 1,234,588 | France | May 16, 1960 |